(12) United States Patent
Haeuser et al.

(10) Patent No.: US 8,566,875 B2
(45) Date of Patent: Oct. 22, 2013

(54) SYSTEM AND METHOD FOR CONTROLLING SETTINGS FOR TELEVISION SERVICES

(75) Inventors: Anthony Haeuser, Aurora, IL (US); Mary McCarthy, San Antonio, TX (US); Scott Pettit, San Antonio, TX (US); Chris Lee, San Antonio, TX (US); Ross Cox, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 516 days.

(21) Appl. No.: 11/341,092

(22) Filed: Jan. 27, 2006

(65) Prior Publication Data

US 2007/0180068 A1 Aug. 2, 2007

(51) Int. Cl.
*G06F 3/00* (2006.01)
*H04N 7/173* (2011.01)

(52) U.S. Cl.
USPC .............................. 725/46; 725/87

(58) Field of Classification Search
USPC ......... 725/32, 46, 53, 80, 87, 91, 97, 100, 52, 725/60, 47, 45; 705/26, 32, 46, 53, 80, 87, 705/91, 97, 100
See application file for complete search history.

(56) References Cited

U.S. PATENT DOCUMENTS

| | | | |
|---|---|---|---|
| 6,226,793 B1 | 5/2001 | Kwoh | |
| 6,321,381 B1 | 11/2001 | Yuen et al. | |
| 6,501,391 B1* | 12/2002 | Racunas, Jr. | ............... 340/932.2 |
| 6,636,607 B1 | 10/2003 | Yang et al. | |
| 6,658,415 B1 | 12/2003 | Brown et al. | |
| 6,662,365 B1 | 12/2003 | Sullivan et al. | |
| 6,694,090 B1 | 2/2004 | Lewis et al. | |
| 6,732,367 B1 | 5/2004 | Ellis et al. | |
| 6,756,997 B1 | 6/2004 | Ward, III et al. | |
| 6,922,843 B1* | 7/2005 | Herrington et al. | ............. 725/30 |
| 6,976,265 B1 | 12/2005 | Yang et al. | |
| 7,380,258 B2* | 5/2008 | Durden et al. | ................... 725/25 |
| 7,389,253 B2* | 6/2008 | Townsend et al. | .............. 705/26 |
| 8,161,172 B2* | 4/2012 | Reisman | ....................... 709/228 |
| 2002/0083002 A1 | 6/2002 | Menez et al. | |
| 2002/0124249 A1* | 9/2002 | Shintani et al. | ................. 725/32 |
| 2003/0208756 A1 | 11/2003 | Macrae et al. | |
| 2004/0117831 A1* | 6/2004 | Ellis et al. | ........................ 725/53 |
| 2004/0172662 A1* | 9/2004 | Danker et al. | ................ 725/135 |
| 2004/0221303 A1 | 11/2004 | Sie et al. | |
| 2005/0028208 A1* | 2/2005 | Ellis et al. | ........................ 725/58 |
| 2005/0160458 A1* | 7/2005 | Baumgartner | ................. 725/46 |
| 2005/0166235 A1* | 7/2005 | Mears et al. | .................... 725/47 |
| 2005/0228881 A1 | 10/2005 | Reasor et al. | |
| 2006/0020984 A1* | 1/2006 | Ban et al. | ....................... 725/97 |
| 2006/0080717 A1* | 4/2006 | Barzilay et al. | ................ 725/100 |
| 2007/0186231 A1* | 8/2007 | Haeuser et al. | ................. 725/25 |
| 2009/0044226 A1* | 2/2009 | Ellis et al. | ........................ 725/46 |

OTHER PUBLICATIONS

C Cho, I Han, Y Jun, H Lee—Advanced Communication Technology, 2004. vol. II, pp. 971-975.*

* cited by examiner

*Primary Examiner* — Gabriel Garcia
(74) *Attorney, Agent, or Firm* — Jackson Walker L.L.P.

(57) ABSTRACT

The present disclosure provides a system, method and computer-readable medium for providing a television service. A group of settings relating to a television service is received from a customer device. A portal is provided to a remote device that enables updating the group of settings. A change to at least one setting is received from the remote device, and the change is made to the at least one setting at the customer device.

20 Claims, 6 Drawing Sheets

SYSTEM AND METHOD FOR CONTROLLING SETTINGS FOR TELEVISION SERVICES

BACKGROUND OF THE DISCLOSURE

1. Field of the Disclosure

The present disclosure relates to the provision of television services over a television network.

2. Background

Television services provided over a television network, such as an Internet Protocol Television (IPTV) network, cable network or satellite network, provide various content such as content over multiple channels, Video-on-Demand (VoD), Voice over Internet Protocol (VoIP), data from the Internet, etc., to customers over a broadband connection. The broadband connection typically terminates at a Set Top Box (STB) located at a customer premise. The STB may be coupled to a television set as well as additional devices, such as a Digital Video Recorder (DVR). A DVR is a device that records video to a digital storage medium, such as a hard disk, in digital form, thereby enabling a viewer to record a show at a given time to be played back at another time, pause live TV shows, and skip advertising, among other things. In addition to the multiple content available, IPTV provides various features to a customer's viewing experience, such as an ability to purchase items through a television set, an integration of television viewing and Internet usage, interactive games, etc.

The STB typically operates a set of features to provide the content to the customer. Some typical features include parental control settings that enable a customer (also referred herein a "supervisor") to restrict the content that may be viewed at a customer location, create a list of favorite channels that may be used to find favorite channels faster, record content on a recorder at the customer premise, and order pay-per-view program, such as special shows and VoD, or purchase an item, such as a book, through the television set, among other things.

Using the television connection, information may be stored at a suitable location, such as at a STB associated with a television set or at a network database that communicates with the STB. With information stored at a network database, it is possible to access the information and make any desired changes. The current systems generally do not provide great flexibility in terms of customer's ability to control the television settings away from the television sets or STBs. Thus, there is a need for an improved system and method that enables customers to control and change settings while away from their television sets and their STBs.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals, wherein.

DETAILED DESCRIPTION OF THE DISCLOSURE

Figure 1:
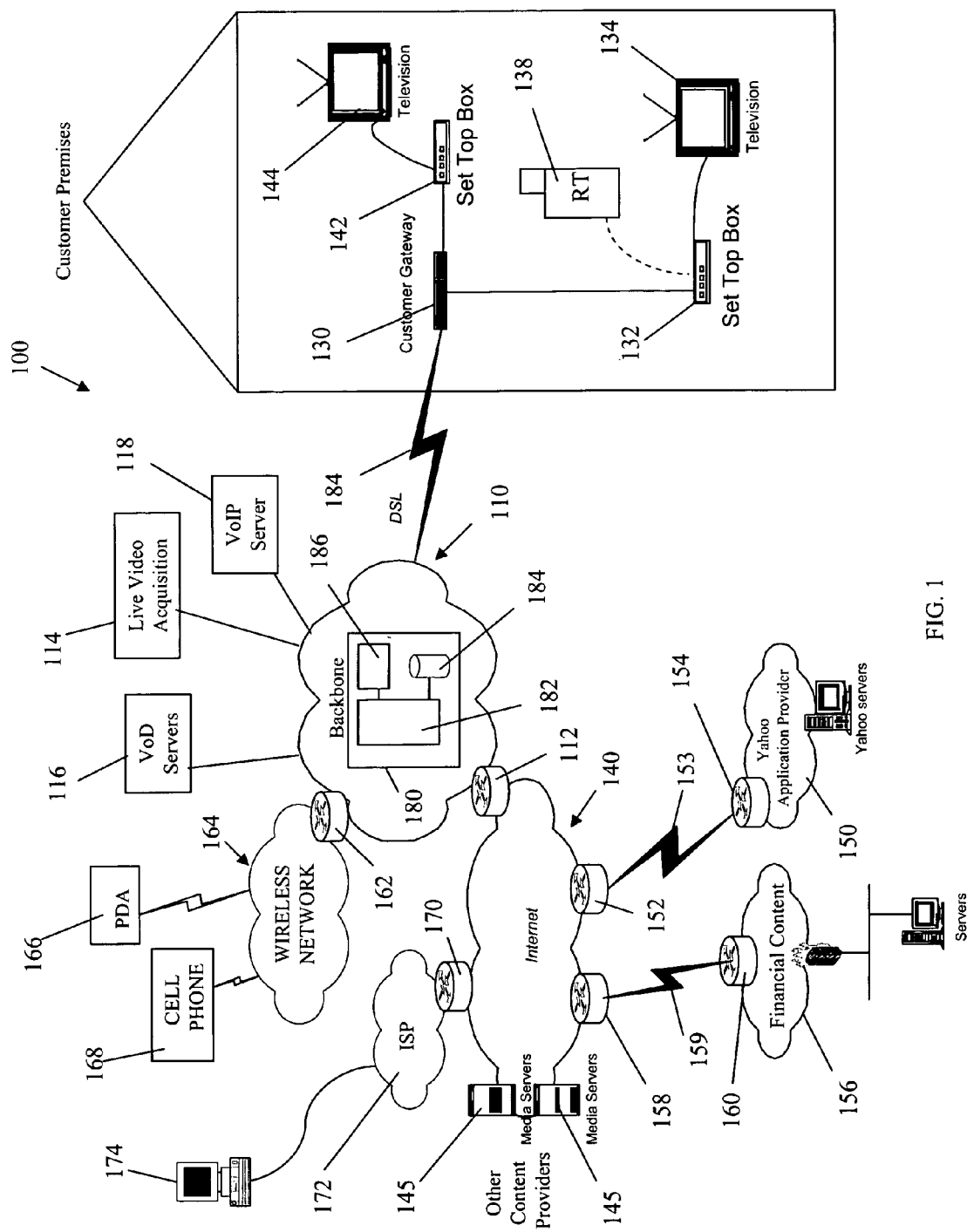
FIG. 1 shows an exemplary high level functional diagram of a network for providing Internet Protocol Television (IPTV) services according to one embodiment of the present disclosure.

In view of the above, the present disclosure through one or more of its various aspects and/or embodiments is presented to provide one or more advantages, such as those noted below.

The present disclosure, in one aspect, provides a computer readable medium that is accessible to a processor for executing instructions contained in a computer program embedded in the computer readable medium, wherein the computer includes instructions to receive settings for a television service from a customer device; instructions to provide the settings to a remote device in response to a request from the remote device; instructions to change a setting in response to a change made via a remote device. The computer program may further include one or more instructions to transmit the change to the customer device, instructions to store the setting received from the remote device in a customer premise device, such as an STB, or in a database accessible to a network server. The change to a setting may include selecting a particular content for viewing on a television or for recording at a customer recorder or changing any other parental control setting or parameter. In one aspect, a web portal is provided to the remote device that enables the customer to review and change any of the settings. The content may be any content that is provided over the television network, including, but not limited to pay-per-view television channels, video-on-demand, orders to purchase products, etc. The computer program further includes instructions to enable the television network to transmit the content to the customer.

In another aspect, the disclosure provides a method for controlling settings for television services from a remote device. The method includes receiving settings for a television service from a customer premise device, sending to a remote device the settings in response to a request from, and changing the settings based on a change made via the remote device, and sending the changes to the customer premise device. In another aspect, the method includes storing the settings received from the customer premise device in an STB and/or in a database associated with a network server. The method, in another aspect, provides a web portal to the remote device for customer to make the changes to the settings. In another aspect, the method provides a confirmation of the changes made over the remote device via an electronic mail (email) over the Internet. In another aspect, the method sends contents to the STB in response to an input received from the remote device.

In yet another aspect, the disclosure provides a system that includes a database for storing a set of settings entered by a customer, a server having access to the database and a computer program embedded in a computer readable medium, wherein the computer program includes instructions to receive settings for a television service from a customer device, instructions to provide the settings to a remote device in response to a request from the remote device, instructions to change a setting in response to a change made via the remote device. The computer program may further include one or more instructions to transmit the change to the customer device and instructions to store the setting received from the remote device in a customer premise device, such as an STB, or in a database accessible to a network server. In yet another aspect, the system integrates the settings at the STB with a web server. Parental control settings may be applied to categories of viewer accounts and are generally applied using a rating system for video content. The remote device includes one of a personal digital assistant, a cellular phone, and a computer. The system also may provide a log of changes to the settings to a customer premise device and/or the remote device.

FIG. 1 shows an exemplary high-level functional diagram of a network 100 for providing IPTV services according to one embodiment of the present disclosure. The network 100 is shown to include a backbone 110 that may be coupled to the Internet 140 via one or more routers, such as a router 112. The backbone may provide at least one of IPTV services, cable service, and satellite services to a customer as well as content available through these services. Such content includes video content, audio content such as Voice over Internet Protocol (VoIP), and data content. The backbone also may include a variety of servers, routers and transport links. The backbone 110 is shown coupled to a live television content provider 114, that may include multiple television channels, such as commonly delivered over television networks. The backbone 110 also is shown to include Video-on-Demand (VoD) servers 116 that provide Video-on-Demand to customers. The backbone 110 is also shown to include a Voice over Internet Protocol (Voice over IP, or VoIP) server 118 that provides telephony service over a packet-switched network using an appropriate protocol, such as VoIP. The backbone 110 is shown coupled via a Digital Subscriber Line (DSL) 184 to a customer gateway, such as a modem 130, which may be coupled to one or more set-top-boxes (STBs), such as STB 132 and STB 142, that are connected to television (TV) sets 134 and 144, respectively. The backbone may additionally couple via a satellite connection to a satellite dish located at the customer location or via a cable connection to a cable STB. The STBs may act as control interfaces for the respective TV sets and may be accessed by remote control, such as remote control 138 that accesses STB 132.

The backbone 110 is further shown coupled to systems of a number of content providers over the Internet 140. For example, the backbone 110 is shown coupled to an Internet service provider (such a "Yahoo") 150 via routers 152 and 154, and link 153; and a financial content provider 156 that may provide a financial service, such as customer investment portfolio information and/or enable a customer to order products and services from one or more vendors utilizing the STB 138, via routers 158 and 160, and link 159. Similarly, the backbone 110 may be coupled to or have access to any other partner content provider (generally designated by numeral 145), such as an interactive gaming service that enables a customer to play games against other players via a television, and a gaming service that enables a customer to bet online and settle accounts.

Still referring to FIG. 1, the backbone network 110 includes a system 180 that includes one or more servers 182, a database 184 that stores customer information, and a set of computer programs 186 which contain instructions that are executed by the server 182 to perform the methods and functions described herein. The customer information stored in the database 184 may include settings related to operations of one or more STBs at a customer location. These settings may include content recording capabilities, parental control of content available to viewers at a TV set, a list of favorite channels or most commonly visited channels ('Favorites') of a customer, as well as information related to broadband and voice service, including VoIP, and credit card numbers that may be charged for interactive activity by the customer, such as for buying merchandise, downloading videos, settling accounts, etc. In one aspect, the database 184 may store settings related to a STB, and these settings may be applied to content at the backbone 110. In another aspect, the STB may store the settings and the server 182 may receive the settings from the STB at a given time, such as on a scheduled basis, or upon request by the server 182 and store the settings in the database 184. In yet another aspect, settings for the STB may be shared between the database and the STB. The settings may be associated to the STB by an IP address, an identifier associated with the STB, or any other suitable identifier.

The backbone 110 is further shown coupled to a wireless network 164, such as a cellular network for cellular communication via a router 162. The wireless network 164 may be accessed by various remote devices enabled for wireless communication, such as cell phone 168 and Personal Digital Assistant (PDA) 166. The Internet 140 is further coupled to an exemplary network of an Internet Service Provider (ISP) 172 that may provide Internet service to a remote device, such as computer 174, which may be connected to the ISP 172 via router 170. A customer using these exemplary remote devices may access settings stored at database 184 and initialize or otherwise change settings. For example, a customer may initialize settings for an STB, such as setting up an account for parental controls, or make changes to settings, such as changing parental control settings. In another example, the customer may remotely program a STB, such as to record a program or to order a program from the VoD server 116. The system 180 also includes one or more computer programs 184 that are executed by the server 182 to perform the methods and functions described herein. The computer program may be distributed and reside in any suitable computer readable media accessible to the server.

Still referring to FIG. 1, content ratings associated with programs accessible to or embedded on a computer-readable medium located at the STB may also enable the parent control mechanism described herein. Parental controls may be used to block a viewer's access to video content such as regular TV programming and to purchases, such as a VoD or pay-per-view (PPV) programs. In a typical customer location where parental controls are used, a TV viewer may be assigned a viewer account that has an associated Personal Identification Number (PIN). The viewer may have several functions enabled through the account. For example, the viewer may create a personal list of channels that are most often viewed ('Favorites'). The viewer may be asked to enter a PIN when interacting with the television set, such as when viewing certain content, or when purchasing video content from the network, such as VoD or PPV, or when purchasing an item, such as a ordering a book through a website, using the television set. Typically, one of the viewer accounts is given supervisory powers over the other viewer accounts and may be accessed by an account supervisor. The account supervisor may perform various functions, such as setting the PINs of the other viewers, controlling the video content that may be viewed by other viewers, monitoring the activities of other viewers, etc. The account supervisor may choose to set up categories of viewer accounts, such as 'Teens' and 'Children,' assign a viewer account to one of these categories, and supervise the activities of the viewer account indirectly through supervision of the category. Alternatively, the supervisor may choose to supervise a viewer account directly. Additionally, if a customer premise has more than one STB, the supervisor may set settings at each STB individually. In one example, using parental controls, a channel, show, or purchase may be blocked at a TV in one room, yet be available at a TV in another room.

Still referring to FIG. 1, a customer may create settings based on television content ratings. There are various rating systems available for use in parental control. One common rating system is provided by Motion Picture Association of America (MPAA) and use the symbols G, PG, PG-13, R, NC-17, X to indicate recommended ages for viewing the content. Another common content rating is the TV ratings system provided by the television industry and includes symbols such as TV-Y (for young children), TV-Y7 (directed toward older children), TV-G (directed towards a general audience), TV-PG (parental guidance suggested), TV-14 (parents strongly cautioned of strong material), and TV-MA (for mature audiences only). In addition, content having a rating of TV-PG, TV-14, and TV-MA may also have additional ratings, such as a V for violence, S for sexual content, L for language, or D for suggestive dialog, and FV for fantasy violence or cartoon violence.

Figure 2:
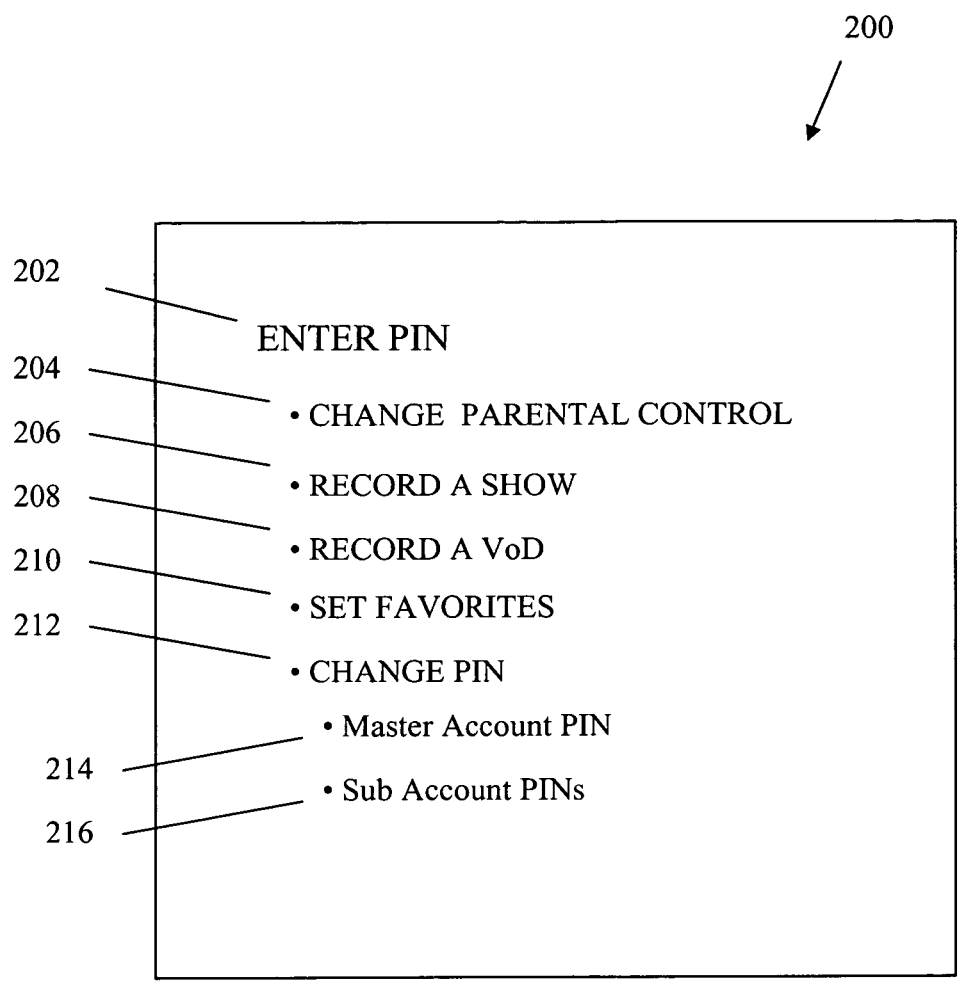
FIG. 2 illustrates an exemplary screenshot displaying options available to a supervisor through an interface accessible by a Set Top Box (STB) or a remote device.

FIG. 2 illustrates an exemplary screenshot 200 displaying options available to a supervisor through an interface accessible by an STB or a remote device. The exemplary screen 200 includes an option to enter a PIN, change parental controls 204, record a show 206, such as a scheduled program, by setting channels and times or by selecting a program ID, record a VoD 208, set up or change a 'Favorites' list for a viewer account (i.e., a list of favorite channels of a viewer), change the PIN(s) 212 of one or more viewer accounts, including the master account 214 and the viewer accounts (sub accounts) 216. Changes to PINs may be made to a group or category of viewer accounts (i.e., 'Teens,' 'Children') or to an individual viewer account. Confirmation of the action of resetting a PIN may be sent to a designated email account. As an example, a user may select settings to record a program or a VoD. The settings may be set through the STB or by using a remote device to access the database 184. Thus, a user may set the STB to record a program or VoD via a cell phone, PDA, computer or any other suitable device, while the user is away from the TV set.

Figure 3:
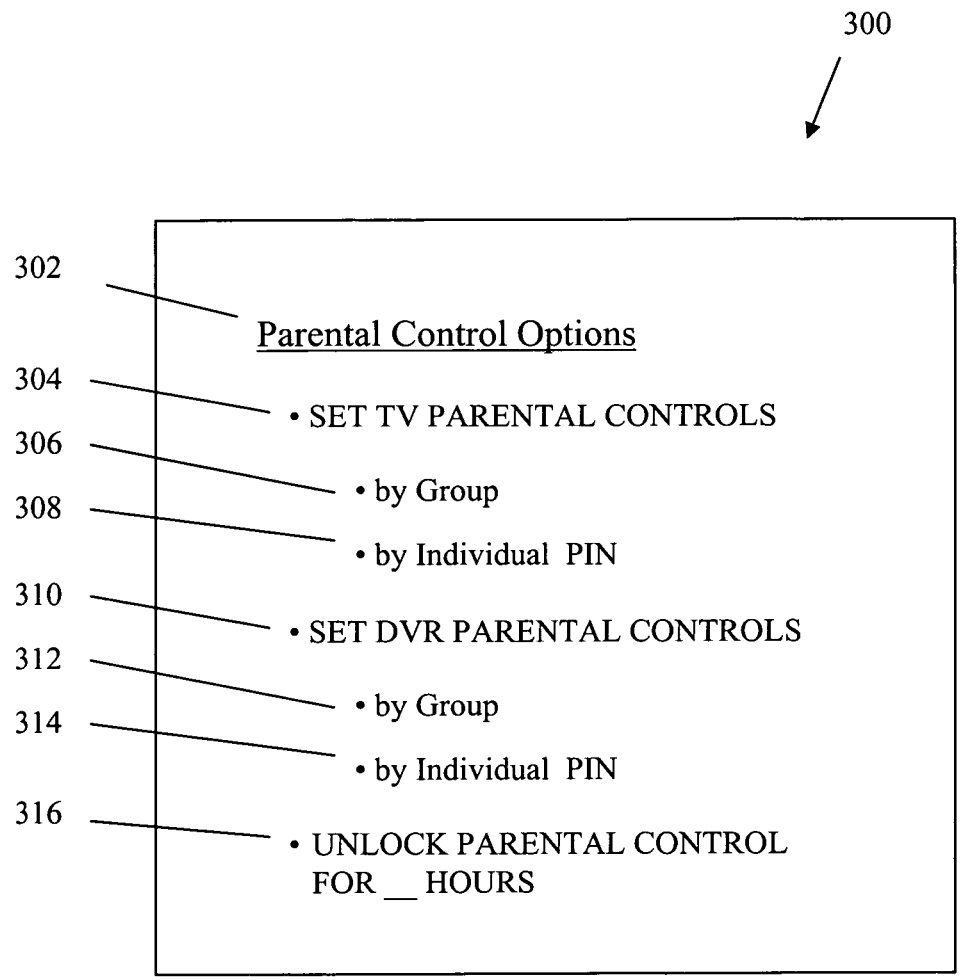
FIG. 3 illustrates an exemplary screenshot for making changes to parental control settings.

FIG. 3 illustrates an exemplary screenshot 300 for making changes to parental control settings. The screenshot is typically displayed once the 'parent controls' option (204) option is selected from screen 200. The screen 300 includes a screen header 302; an option for setting a parental control for a television set 304; an option for setting parental controls related to Digital Video Recorder (DVR) content 310; and an option for unlocking parental controls for a specified amount of time 316. The option for setting parental controls on a television may be performed for a category of viewers 306 or for individual viewers 308. Parental controls may be set for multiple STBs so that video content that is restricted at one television set, such as a television in a living room area and may be enabled at another television set, such as a television in a bedroom area. A customer location may have multiple DVRs. Therefore, parental control settings may be assigned to each of the multiple DVRs by selecting the appropriate options. Parental controls may be applied to DVR content by group or category or by each individual account 314. A log of changes and any overrides (such as unlocking parental controls) may be recorded and made available to an email account.

Figure 4:
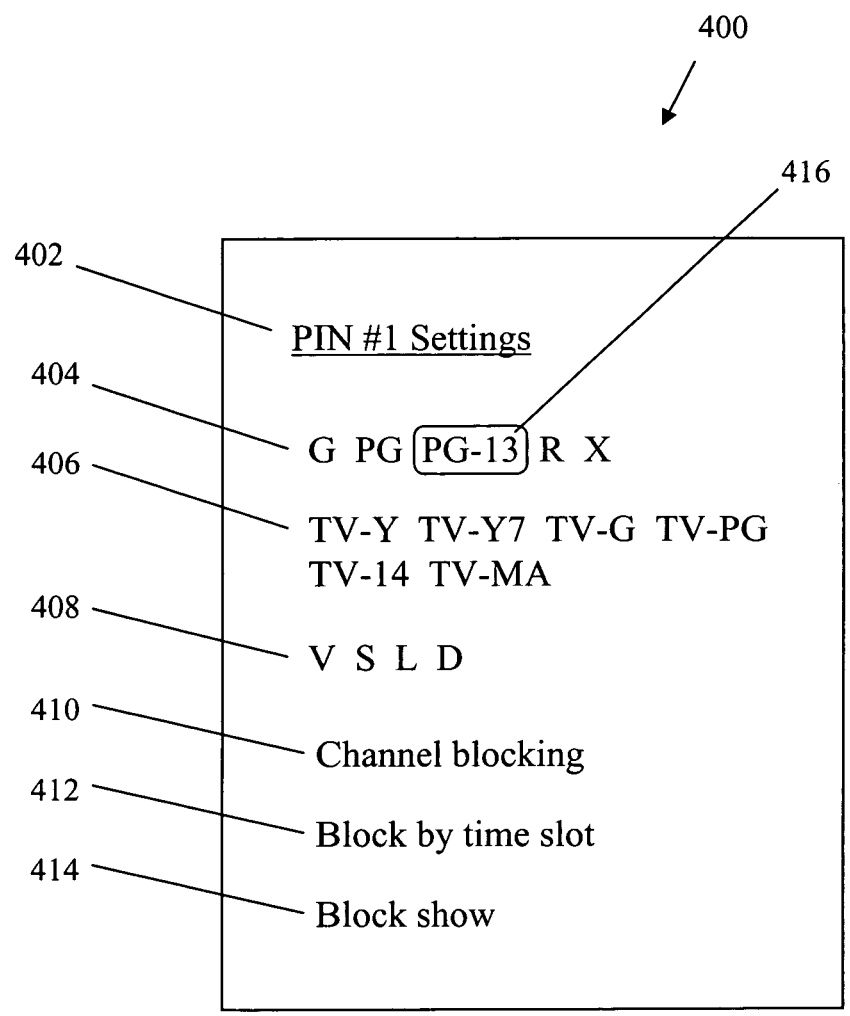
FIG. 4 shows an exemplary screenshot of parental control settings of an individual account.

FIG. 4 shows a screenshot 400 of parental control settings of an individual account. The screenshot displays various ratings systems that may be used in connection with parental control settings. Some exemplary ratings systems are the MPAA ratings system 404, the television ratings system 406, and a ratings system identifying potentially objectionable content (V, S, L, D, FV) 408. A supervisor selects the rating level, thereby blocking content having that rating (or higher). In the exemplary screen 400, the supervisor has selected 'PG-13' 416 for the PIN #1 viewer, so that the PIN #1 viewer is restricted from viewing content rated at 'PG-13' (or higher). The supervisor may also select to block certain channels (i.e., HBO) from being viewed, or a certain show (i.e., Survivor) from being viewed. In another aspect, an account manager may restrict television viewing for a selected time period.

In the present disclosure, the settings of the STB are integrated into database 184 and may be accessed through a suitable portal, such as the Yahoo! portal. A viewer using a remote device, such as computer 174, may access the setting at the database via the remote device and make any desired changes. Once changes have been made, those changes may be communicated from the database to the STB. For example, a viewer is out shopping remembers that he would like to record a show on his DVR that is due to begin before he returns home. The viewer uses his cell phone (114 of FIG. 1) to establish a link to the backbone (110 of FIG. 1) via, for example, the screen illustrated in FIG. 2. By selecting an appropriate action (i.e., 'Record a Show' 206), he may be presented with a selection of programs from which to make a selection. Once he makes his selection, the changes may be stored to the database and transmitted to the STB. The settings at the STB are updated to reflect the viewer selection.

Figure 5:
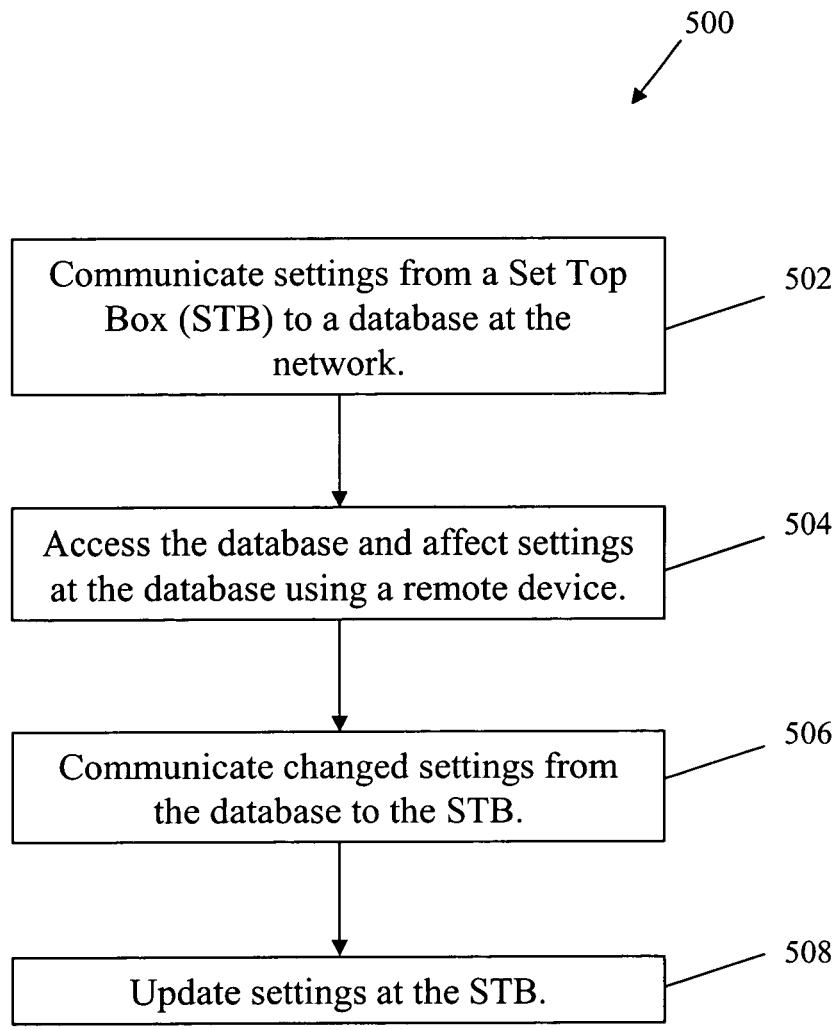
FIG. 5 illustrates a flowchart of an exemplary method according to one aspect of the present disclosure for affecting Set Top Box settings from a remote device.

FIG. 5 illustrates a flowchart 500 of one aspect of the present disclosure for affecting settings at a STB from a remote device. In Box 502, the settings are communicated from the STB to a database, such as database 184. The viewer then accesses the settings from a remote device, such as a cell phone, a PDA, a remote computer, etc., and makes the changes in the settings (Box 504), wherein changes may include instructing the STB to record a program or a VoD, changing a 'Favorites' list, setting parental controls, etc. In Box 506, once the settings have been set, the settings are stored at the database and communicated back to the STB. Changes are then made at the STB by updating the affected settings at the STB (Box 508).

Figure 6:
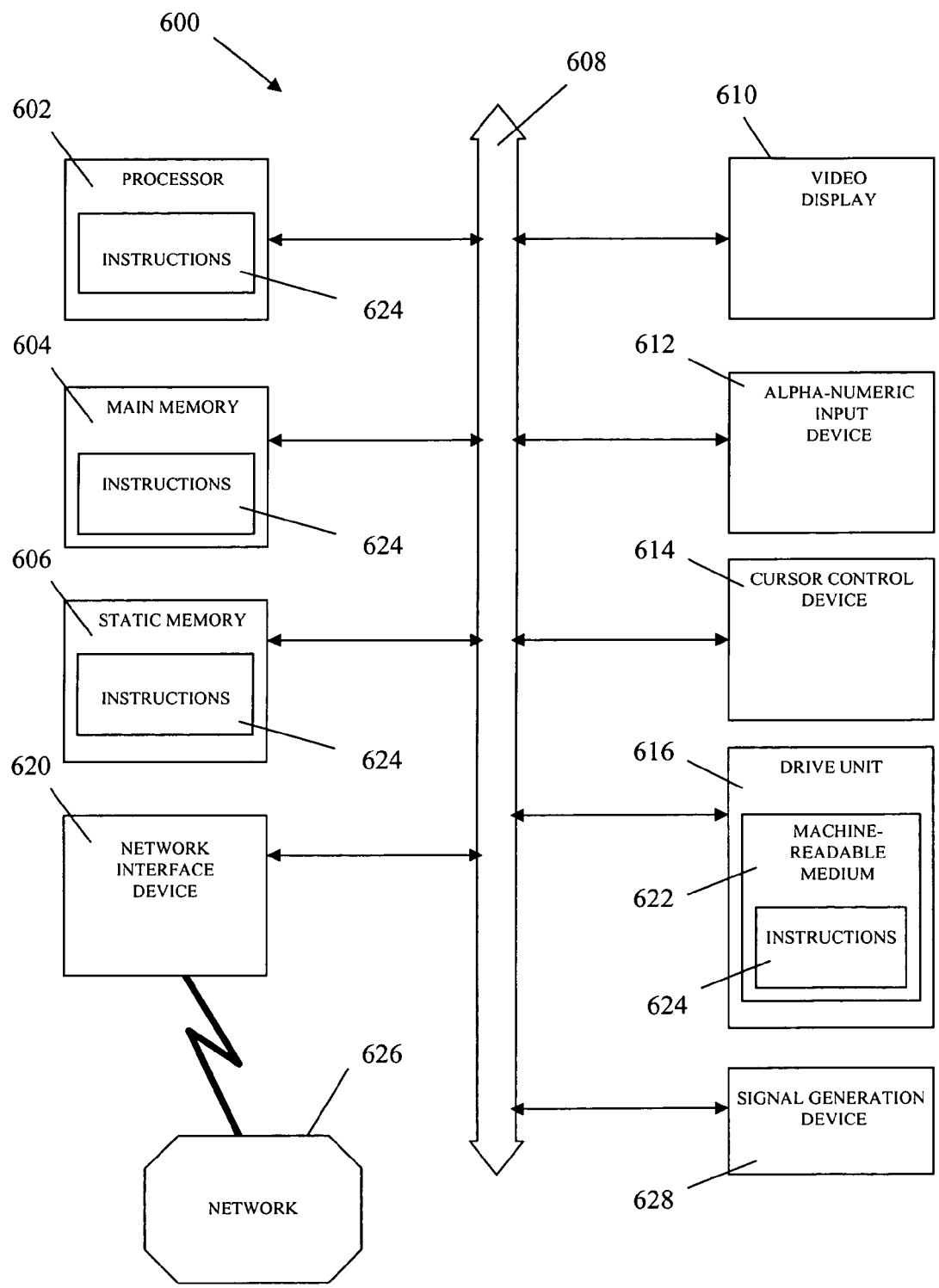
FIG. 6 is a diagrammatic representation of a machine in the form of a computer system within which a set of instructions, when executed, may cause the machine to perform any one or more of the methodologies of the present disclosure.

FIG. 6 is a diagrammatic representation of a machine in the form of a computer system 600 within which a set of instructions, when executed, may cause the machine to perform any one or more of the methodologies discussed herein, including specifying initial settings, changes made to the settings via a customer premise equipment, such as an STB and/or a remote device over the Internet or another suitable network, and updating the changes on to the STB and the network databases. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory computer readable medium including processor-executable program instructions that, when executed by a processor, cause the processor to perform operations comprising:
receiving, by a web server, account settings from a customer premise device associated with a television account, wherein the television account settings include settings selected from parental control settings, content recording settings, and favorite channel settings;
responsive to receiving, from a remote device, account settings including personal identification number settings from an account supervisor associated with the television account, changing a personal identification number associated with another user of the television account;
responsive to receiving, by the web server from the account supervisor, account settings including set top box settings, changing a parental control setting indicative of a parental control feature with respect to a first set top box associated with the television account, wherein the parental control setting has a first value for the first set top box and a second value, different from the first value, for a second set top box;
responsive to receiving, by the web server from the account supervisor, account settings including an unlock setting, temporarily unlocking the parental control feature associated the other user for an indicated duration;
responsive to receiving, by the web server from the account supervisor, account settings including a group setting indicative of a group including a plurality of other users of the television account, applying the parental control to each of the other users in the group; and
responsive to receiving, by the web server from the account supervisor, account settings including a digital video recording setting, applying the parental control feature to content recorded with a digital video recorder feature associated with the television account; and
implementing account setting changes received by the web server at the customer premise device.

2. The computer readable medium of claim 1, wherein the customer premise device is a set top box and the program instructions are executed by a service provider server that includes the processor.

3. The computer readable medium of claim 1, wherein the operations include:
storing the account settings received from the customer premise device in a database accessible to a network server.

4. The computer readable medium of claim 1, wherein the operations include:
responsive to receiving, by the web server, a request, associated with the television account, to record selected content, recording the selected content.

5. The computer readable medium of claim 4, wherein the operations include:
transmitting the selected content to the customer premise device.

6. The computer readable medium of claim 1, wherein the operations include:
responsive to receiving a request to purchase selected content, wherein the selected content is selected from a pay-per-view program and a video-on-demand program, providing the customer premise equipment with access to the selected content.

7. The computer readable medium of claim 1, wherein the operations include:
responsive to receiving account settings including a group favorites setting, associating a favorites list, indicative of a plurality of channels provided via the television account, with the group.

8. A system for providing content over an IP television network, the system comprising:
a network server;
computer readable storage, accessible to the server, including processor executable instructions that, when executed by the server, cause the server to perform operations comprising:
storing account settings, received from a customer premise device via the IP television network, the account settings associated with a television account wherein the account settings include an account setting selected from a parental control setting, a content recording setting, and a favorite channel setting;
responsive to receiving, from a remote device, account settings including personal identification number settings from an account supervisor associated with the television account, changing a personal identification number associated with another user of the television account;
responsive to receiving, by the web server from the account supervisor, account settings including set top box settings, changing a parental control setting indicative of a parental control feature with respect to a first set top box associated with the television account, wherein the parental control setting has a first value for the first set top box and a second value, different from the first value, for a second set top box;
responsive to receiving, by the web server from the account supervisor, account settings including an unlock setting, temporarily unlocking the parental control feature associated the other user for an indicated duration;
responsive to receiving, by the web server from the account supervisor, account settings including a group setting indicative of a group including a plurality of other users of the television account, applying the parental control to each of the other users in the group; and
responsive to receiving, by the web server from the account supervisor, account settings including a digital video recording setting, applying the parental control feature to content recorded with a digital video recorder feature associated with the television account; and
implementing account setting changes received by the web server at the customer premise device.

9. The system of claim 8, wherein the customer premise device is a set top box and the program instructions are executed by a service provider server that includes the processor.

10. The system of claim 8, wherein the operations include:
storing the account settings received from the customer premise device in a database accessible to a network server.

11. The system of claim 8, wherein the operations include:
responsive to receiving, by the web server, a request, associated with the television account, to record selected content, recording the selected content.

12. The computer readable medium of claim 11, wherein the operations include:

transmitting the selected content to the customer premise device.

13. The system of claim 8, wherein the operations include:

responsive to receiving a request to purchase selected content, wherein the selected content is selected from a pay-per-view program and a video-on-demand program, providing the customer premise equipment with access to the selected content.

14. The system of claim 8, wherein the operations include:

responsive to receiving account settings including a group favorites setting, associating a favorites list, indicative of a plurality of channels provided via the television account, with the group.

15. A method for providing content over an IP television network, the method comprising:

storing account settings, received from a customer premise device via the IP television network, the account settings associated with a television account wherein the account settings include an account setting selected from a parental control setting, a content recording setting, and a favorite channel setting;

responsive to receiving, from a remote device, account settings including personal identification number settings from an account supervisor associated with the television account, changing a personal identification number associated with another user of the television account;

responsive to receiving, by the web server from the account supervisor, account settings including set top box settings, changing a parental control setting indicative of a parental control feature with respect to a first set top box associated with the television account, wherein the parental control setting has a first value for the first set top box and a second value, different from the first value, for a second set top box;

responsive to receiving, by the web server from the account supervisor, account settings including an unlock setting, temporarily unlocking the parental control feature associated the other user for an indicated duration;

responsive to receiving, by the web server from the account supervisor, account settings including a group setting indicative of a group including a plurality of other users of the television account, applying the parental control to each of the other users in the group; and responsive to receiving, by the web server from the account supervisor, account settings including a digital video recording setting, applying the parental control feature to content recorded with a digital video recorder feature associated with the television account; and implementing account setting changes received by the web server at the customer premise device.

16. The method of claim 15, wherein the customer premise device is a set top box and the program instructions are executed by a service provider server that includes the processor.

17. The method of claim 15, further comprising:

storing the account settings received from the customer premise device in a database accessible to a network server.

18. The method of claim 15, further comprising:

responsive to receiving, by the web server, a request, associated with the television account, to record selected content, recording the selected content.

19. The computer readable medium of claim 18, further comprising:

transmitting the selected content to the customer premise device.

20. The method of claim 15, further comprising:

responsive to receiving a request to purchase selected content, wherein the selected content is selected from a pay-per-view program and a video-on-demand program, providing the customer premise equipment with access to the selected content; and responsive to receiving account settings including a group favorites setting, associating a favorites list, indicative of a plurality of channels provided via the television account, with the group.

\* \* \* \* \*